May 8, 1945.    W. A. BAILEY, JR., ET AL    2,375,725
CATALYTIC CONVERSION OF HYDROCARBON OILS
Filed April 19, 1944
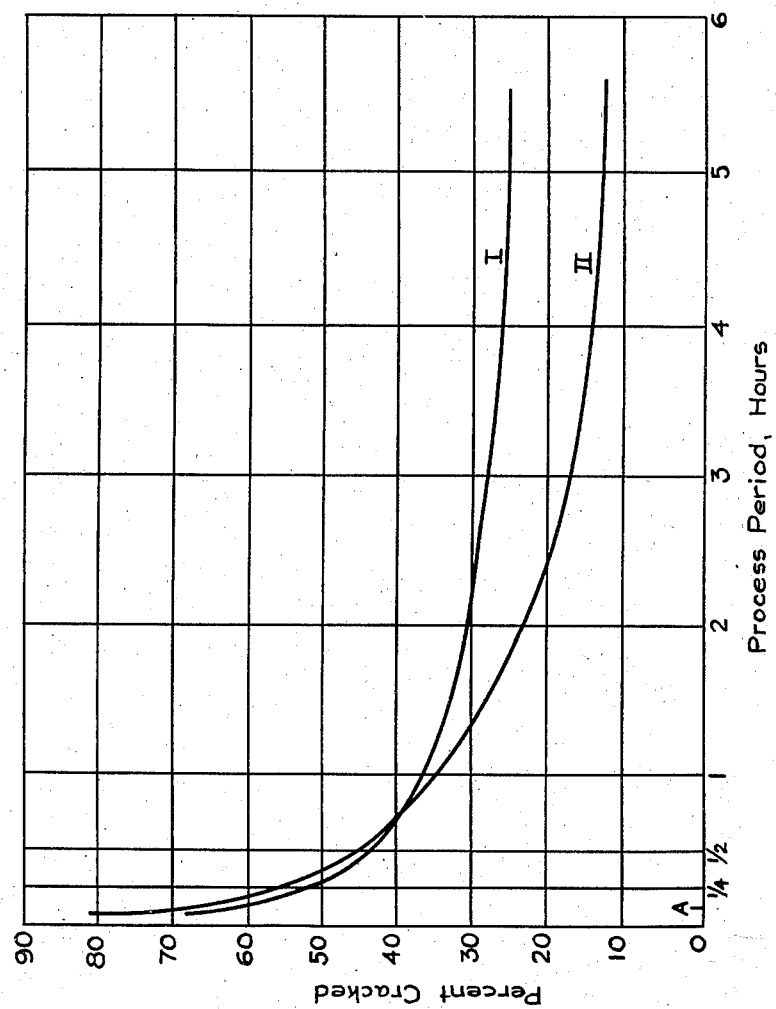
Inventors: William A. Bailey Jr.
Bernard S. Greensfelder
By their Attorney:

Patented May 8, 1945

2,375,725

UNITED STATES PATENT OFFICE 2,375,725

CATALYTIC CONVERSION OF HYDROCARBON OILS

William A. Bailey, Jr., and Bernard S. Greensfelder, Oakland, Calif., assignors to Shell Development Company, San Francisco, Calif., a corporation of Delaware Application April 19, 1944, Serial No. 532,008

7 Claims. (Cl. 196—52)

This invention relates to an improvement in the catalytic conversion of hydrocarbon oils, such as naphthas, stove oils, middle oils, gas oils, flash distillates and the like to produce hydrocarbon oils having a lower average molecular weight, such in particular as gases, gasoline, light naphthas, etc. The invention depends upon the use of a specific type of catalyst under specific conditions.

The object of the invention is to provide an improved process for converting various hydrocarbon oils into hydrocarbon oils and/or gases having lower average molecular weight whereby better conversions to the desired products may be obtained.

As is known, we are at present dependent to a large extent for our supply of gasoline and certain lower boiling hydrocarbons upon the production of these materials from various hydrocarbon materials of high molecular weight, such for example as naphthas, stove oils, gas oils and heavier petroleum residues. Valuable lower boiling liquid and gaseous hydrocarbons and mixtures thereof are produced from such higher boiling hydrocarbon materials by the so-called cracking processes. In the past, most cracking processes have depended entirely upon thermal decomposition of the higher boiling materials. More recently these thermal processes have become partly superseded by processes in which the cracking is promoted and to a large extent directed by the use of special catalysts. Almost from the first application of cracking as a process it was found that the cracking reactions can be accelerated, i. e. catalyzed, by the presence of a wide variety of materials and that in some cases the presence of these materials gives superior products. Consequently, ever since the use of cracking as a process, and especially during the last decade, a great amount of work has been done to develop suitable catalysts for cracking processes. In this work almost every conceivable type of material was tested as a catalyst, and as a result, an almost unbelievable array of materials have been suggested as suitable catalysts. Cracking, however, is of such importance and carried out on such a scale that even small differences, such as in the conversions obtained, the amount of coke formed, or in the distribution of hydrocarbons in the product, are of great importance. After careful evaluation of literally thousands of suggested catalysts, the art has therefore discarded nearly all of the various suggested materials and has restricted attention to two or three catalysts which were found to be superior. These two or three catalysts differ among themselves in certain particulars, but are of a single type. They consist essentially of a major amount of silica and a minor amount of alumina. The chemical combination, if any, between the silica and alumina is not completely understood and the catalysts are therefore variously referred to as "silica-alumina blends," "silica-alumina composites" and "hydrous aluminum silicates." The best catalyst in commercial use at present is such a catalyst.

Various processes have been developed for the efficient use of these catalysts. The most common and best known method is that in which the catalyst is provided in a fixed bed in a number of converters or catalysts cases. Oil to be cracked is passed through the catalyst under cracking conditions until the conversion drops to a predetermined level due to deposition of carbonaceous matter on the catalyst, and then the catalyst is regenerated in situ by burning off the carbonaceous matter. A number of catalytic converters is provided so that when one converter is regenerating, another is processing, thereby affording an essentially continuous operation. More recently a moving bed system typified by the Thermofor catalytic cracking process has come into use. In this process the catalyst is slowly passed down through a vertical reaction chamber, then through a vertical regeneration chamber, and is recycled by means of mechanical conveyers. Also, a so-called "fluidized catalyst system" has recently come into use. In this system the catalyst is maintained in a reaction zone in a so-called "fluidized state" and the hydrocarbon vapors to be reacted are "bubbled" up through the bed of "fluidized" catalyst.

One catalytic agent repeatedly tried by others and discarded in favor of the above mentioned silica-alumina catalysts is boric oxide. Boric oxide in combination with suitable supports, such in particular as alumina and certain siliceous gels is a fairly active catalyst. Although the use of these catalysts for cracking has been patented, the results obtained were in all cases inferior to those obtained with the commercial silica-alumina composite catalyst and none of these catalysts has been applied commercially.

We have been engaged for a period of years in the study and development of cracking catalysts and have spent a good portion of this time in an attempt to develop boric oxide catalysts. We have succeeded in developing certain supported boric oxide catalysts which are superior to the best of the hitherto known silica-alumina catalysts under the usual cracking conditions.

The silica-alumina catalysts, and all cracking catalysts for that matter, lose their efficiency during use, due in part to a deposition of carbonaceous deposits on them. Consequently, it is necessary to regenerate the catalyst by periodically burning off deposited carbonaceous matter. The period of use of the catalyst between successive regenerations is usually referred to as the process period. Process periods in the range of 3 to 6 hours are generally applicable. However, somewhat shorter process periods are considered optimum and for test purposes a process period of 1 hour is most generally applied.

It is now found that boric oxide catalysts differ fundamentally from other cracking catalysts, and particularly the silica-alumina catalysts, in that during the first few minutes of use in any process period the efficiency of the catalyst (both with respect to cracking activity and the character of the cracking products) declines at an abnormally high rate. This is surprising since the boric oxide catalysts in general cause the formation of less carbonaceous deposits than other proprietary cracking catalysts. Thus, by greatly reducing the process period, the efficiency of the conversion with boric oxide catalysts can be greatly increased, and the increase is much greater than any increase obtained with silica-alumina catalysts or other proprietary cracking catalysts. In fact, the increase in efficiency brought about by reducing the process period to below about 7 minutes is so great that a boric oxide catalyst which is distinctly inferior to the best of the hitherto known silica-alumina cracking catalysts at a process period of 1 hour, may be considerably more efficient when compared at a process period of say 5 minutes. This is illustrated in the attached graph forming a part of the specification. Referring to the graph, Curve I is typical of the results obtained under representative conditions of temperature, liquid hourly space velocity, etc., in cracking a typical gas oil using a given volume of a commercial silica-alumina type cracking catalyst containing about 87% silica and about 13% alumina. The results used in this illustration are those obtained with the best of the hitherto known cracking catalysts. Curve II is typical of the results obtained under comparable conditions with boric oxide catalysts. The results used in this illustration are those obtained under comparable conditions using a catalyst consisting of boric oxide supported upon an adsorptive alumina. It will be observed that when operating at the usual process periods, the silica alumina catalyst is superiod to the boric oxide catalyst. When operating at a process period of about 45 minutes, the two catalysts are seen to give about the same results. At shorter process periods, for example, 30 minutes, the two catalysts are nearly equal, but the boric oxide catalyst is slightly superior. Even at process periods of 15 minutes, the difference between the two catalysts is not very marked. As the process period is decreased, however, to below 7 minutes (indicated on the abscissa by point A), the difference between the two catalysts becomes very marked. Thus, at a process period of about 5 minutes, the boric oxide catalyst is seen to give about 14% greater depth of cracking. Thus, the boric oxide catalyst, which under standard test conditions shows to be 94% as active as the silica-alumina catalyst, is 121% as active when the process period is reduced to about 5 minutes. This behavior is quite unexpected, particularly in view of the fact that the amount of carbon formed with the boric oxide catalyst is somewhat lower than that formed with the silica alumina catalyst.

In the process of the invention we make use of this hitherto unrecognized property of boric oxide catalysts. According to the process of the invention, the catalytic conversion of various hydrocarbon oils is effected with materially increased efficiency by using boric oxide catalysts and limiting the period of use between successive regenerations to not more than 7 minutes. By operating in the described manner, it is possible to obtain results which are better than those obtained under similar and comparable conditions with the best of the hitherto known silica-alumina catalysts even when using boric oxide catalysts which under normal conditions have been found to be distinctly inferior.

The catalysts giving results of the type illustrated in Curve II of the attached graph and employed in the process of the present invention contain boric oxide as an active agent. The boric oxide is usually used in a minor amount in combination with a major amount of a carrier or supporting material which may be, for example, alumina, silica, silica-alumina composites, or the like. Particularly suitable catalysts comprise between about 8% and 30% boric oxide in combination with a major amount of an alumina gel which may furthermore be provided with a small amount (for example, from about 3 to about 15%) of silica and a small amount, (for example, between about 0.1 and 1%) of an alkali such as sodium oxide or potassium oxide. The preparation of very desirable catalysts of this type is described in co-pending application, Serial No. 490,090, filed June 8, 1943.

The process of the invention is generally applicable for the catalytic cracking of various hydrocarbon oils, such as mentioned above, to produce normally gaseous and/or normally liquid hydrocarbon materials of lower molecular weight, such in particular as gasoline. According to the process of the present invention, these various material are catalytically cracked with the above specified catalysts while restricting the process period to about 7 minutes. In general, process periods in the order of 3-5 minutes are preferred. The process may be carried out by contacting the hydrocarbon to be cracked with the catalyst under conditions of temperature, pressure, space velocity, etc., such as are applicable and ordinarily used in catalytic cracking under normal conditions. Thus, for example, the temperature may range from about 700° F. to about 1100° F.; the pressure may vary over any desired range, but is generally in the order of 1 to 5 atmospheres absolute; the liquid hourly space velocity (volumes of hydrocarbon feed measured as a liquid contacted with 1 volume of catalyst per hour) may vary from about 0.5 to about 3; the time of contact of the oil with the catalyst may, for example, be between about 0.5 and 3 seconds. Steam may be used as a diluent in any desired amount. Usually the amount of steam used is between ¼ and 2 volumes of steam per volume of oil vapors treated.

The regeneration of the catalyst after each short process period may be effected in the usual way by burning carbonaceous deposits from the catalyst under controlled conditions of temperature.

We claim as our invention:

1. A process for the catalytic conversion of a hydrocarbon oil into a hydrocarbon product of lower molecular weight which comprises contacting the hydrocarbon oil to be converted at a temperature within the range of about 700° F. to 1100° F. and under conversion conditions with a solid supported boric oxide catalyst and regenerating said boric oxide catalyst by burning after each short period not exceeding 7 minutes of contact under conversion conditions with said oil.

2. A process for the catalytic conversion of a hydrocarbon oil heavier than gasoline into a hydrocarbon product comprising gasoline which comprises contacting the hydrocarbon oil to be converted at a temperature within the range of about 700° F. to 1100° F. and under conversion conditions with a solid supported boric oxide catalyst and regenerating said boric oxide catalyst by burning after each short period not exceeding 7 minutes of contact under conversion conditions with said oil.

3. A process for the catalytic conversion of a hydrocarbon oil into a hydrocarbon product of lower molecular weight which comprises contacting the hydrocarbon oil to be converted at a temperature within the range of about 700° F. to 1100° F. and under conversion conditions with a solid supported boric oxide catalyst and regenerating said boric oxide catalyst by burning after each short period of between about 3 and 5 minutes of contact under conversion conditions with said oil.

4. A process for the catalytic conversion of a hydrocarbon oil into a hydrocarbon product of lower molecular weight which comprises contacting the hydrocarbon oil to be converted at a temperature within the range of about 700° F. to 1100° F. and under conversion conditions with a solid supported cracking catalyst comprising a major amount of alumina and a minor effective amount of boric oxide and regenerating said catalyst by burning after each short period not exceeding 7 minutes of contact under conversion conditions with said oil.

5. A process for the catalytic conversion of a hydrocarbon oil into a hydrocarbon product of lower molecular weight which comprises contacting the hydrocarbon oil to be converted at a temperature within the range of about 700° F. to 1100° F. and under conversion conditions with a solid catalyst comprising from about 8 to 30% boric oxide, from about 3 to about 15% silica, from about 0.1 to about 1% of an alkali metal oxide, and at least 50% of an alumina gel, and regenerating said catalyst by burning after each short period not exceeding 7 minutes of contact under conversion conditions with said oil.

6. A process for the catalytic conversion of a hydrocarbon oil into a hydrocarbon product of lower molecular weight which comprises contacting the hydrocarbon oil to be converted under cracking conditions with a solid catalyst comprising boric oxide and regenerating said catalyst after each short period not exceeding 7 minutes of contact under conversion conditions with said oil.

7. A process for the catalytic conversion of a hydrocarbon oil into a hydrocarbon product of lower molecular weight which comprises contacting the hydrocarbon oil to be converted under cracking conditions with a solid catalyst comprising a major amount of alumina and minor amounts of boric oxide and silica, and regenerating said catalyst after each short period not exceeding 7 minutes of contact under conversion conditions with said oil.

WILLIAM A. BAILEY, Jr.
BERNARD S. GREENSFELDER.